(12) United States Patent
Singh

(10) Patent No.: US 7,966,325 B2
(45) Date of Patent: Jun. 21, 2011

(54) SYSTEM AND METHOD FOR RANKING SEARCH RESULTS USING SOCIAL INFORMATION

(75) Inventor: Vikash Singh, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 93 days.

(21) Appl. No.: 12/237,336

(22) Filed: Sep. 24, 2008

(65) Prior Publication Data
US 2010/0082593 A1 Apr. 1, 2010

(51) Int. Cl.
*G06F 7/00* (2006.01)
(52) U.S. Cl. .................................... 707/732
(58) Field of Classification Search ............. 707/732, 707/3, 999.003
See application file for complete search history.

(56) References Cited

U.S. PATENT DOCUMENTS

| | | | |
|---|---|---|---|
| 2007/0282785 A1* | 12/2007 | Fayyad et al. | 707/1 |
| 2009/0125517 A1* | 5/2009 | Krishnaswamy et al. | 707/6 |
| 2009/0164929 A1* | 6/2009 | Chen et al. | 715/769 |

* cited by examiner

*Primary Examiner* — Greta L Robinson
*Assistant Examiner* — Jensen Hu
(74) *Attorney, Agent, or Firm* — Buchenhorner Patent Law

(57) ABSTRACT

An improved system and method for ranking search results using social information is provided. A social information ranking engine may be provided to rerank a list of URLs of web pages in search results from a search engine using social information. To do so, the search query may be applied to a social information domain and a second list of references to web pages may be obtained as search results. A dimensional vector of users with the plurality of terms may be constructed using search results from social information domain, and a similarity measure may be computed between the references to web pages obtained from search results by the search engine and the references to web pages obtained from search results by the social information ranking engine. The score from the similarity measure may then be used to rerank the list of references to web pages.

14 Claims, 5 Drawing Sheets

SYSTEM AND METHOD FOR RANKING SEARCH RESULTS USING SOCIAL INFORMATION

FIELD OF THE INVENTION

The invention relates generally to computer systems, and more particularly to an improved system and method for ranking search results using social information.

BACKGROUND OF THE INVENTION

Current search technology may display a search results page that lists multiple websites with relevant information for a search query submitted by a user. In order to find desired content for the search query, a user may select a website to view the content. If the website does not present the desired content, a user may continue to select other websites to view the content or submit another search query to receive a search results page with a different listing of websites to view. Frequently users experience frustration in finding desired content when too many websites are viewed in order to find desired content and when several search queries need to be submitted to find desired content. Although functional, finding the content desired for many search queries presents a challenging task when using the current search technology.

From a user perspective, search engines may often return poor results for certain search queries. Although user interfaces for search queries may explicitly or implicitly expand search terms to help, users often learn good search terms for the desired content by iteratively submitting search terms and receiving results. Such a cyclical process of trial and error can be very inefficient and discouraging for many users. Unfortunately, the ability to refine search results by trusted communities is lacking. Instead, users are commonly presented with pages and pages of search results that represent an overwhelming space of results to be explored to find desired content. Exploring such a potentially immense results space by iteratively selecting websites to view the content is a rudimentary and cumbersome.

What is needed is a way for a user to efficiently filter search results of a search query and more effectively find the content desired. Such a system and method should support implicit or explicit refinement of search results to allow users to effectively and efficiently find the desired results.

SUMMARY OF THE INVENTION

The present invention provides a system and method for ranking search results using social information. A social information ranking engine operably coupled to a search engine may be provided to rerank a list of URLs of web pages in search results using social information. A search query may be received by a search engine to obtain a list of references to web pages as search results, and the search engine may obtain a list of references to web pages as search results. The list of references to web pages may be reranked using social information, and the reranked list of references to web pages may then be sent as search results to a client device for display to a user. In an embodiment, a user may indicate a social information domain used to rerank the search results.

To rerank a list of references to web pages obtained as search results, the search query may be applied by the social information ranking engine to a social information domain and a second list of references to web pages may be obtained as search results. A bipartite graph may be generated in an embodiment with a group of users connected by weighted edges to a group of terms associated with the second list of references to web pages obtained as search results of the social information domain. A dimensional vector of the plurality of users with the plurality of terms may be constructed from the bipartite graph, and a similarity measure may be computed between the references to web pages obtained from search results by the search engine and the references to web pages obtained from search results by the social information ranking engine. The scores from the similarity measure may then be used to rerank the list of references to web pages. And the reranked list of references to web pages may be sent as search results to a client device for display to a user.

The present invention may support many applications for ranking search results using social information. For example, online search applications may use the present invention to rank a list of search results using social information from a social network website. Or online search applications may use the present invention to rank a list of search results using social information from a website that supports content for a particular social interest. Similarly, online search applications may use the present invention to select a list of products for an ecommerce transaction using social information from a social network website. For any of these online search applications, search results may be ranked by the present invention using social information for display to a user.

Other advantages will become apparent from the following detailed description when taken in conjunction with the drawings, in which:

DETAILED DESCRIPTION

Exemplary Operating Environment

Figure 1:
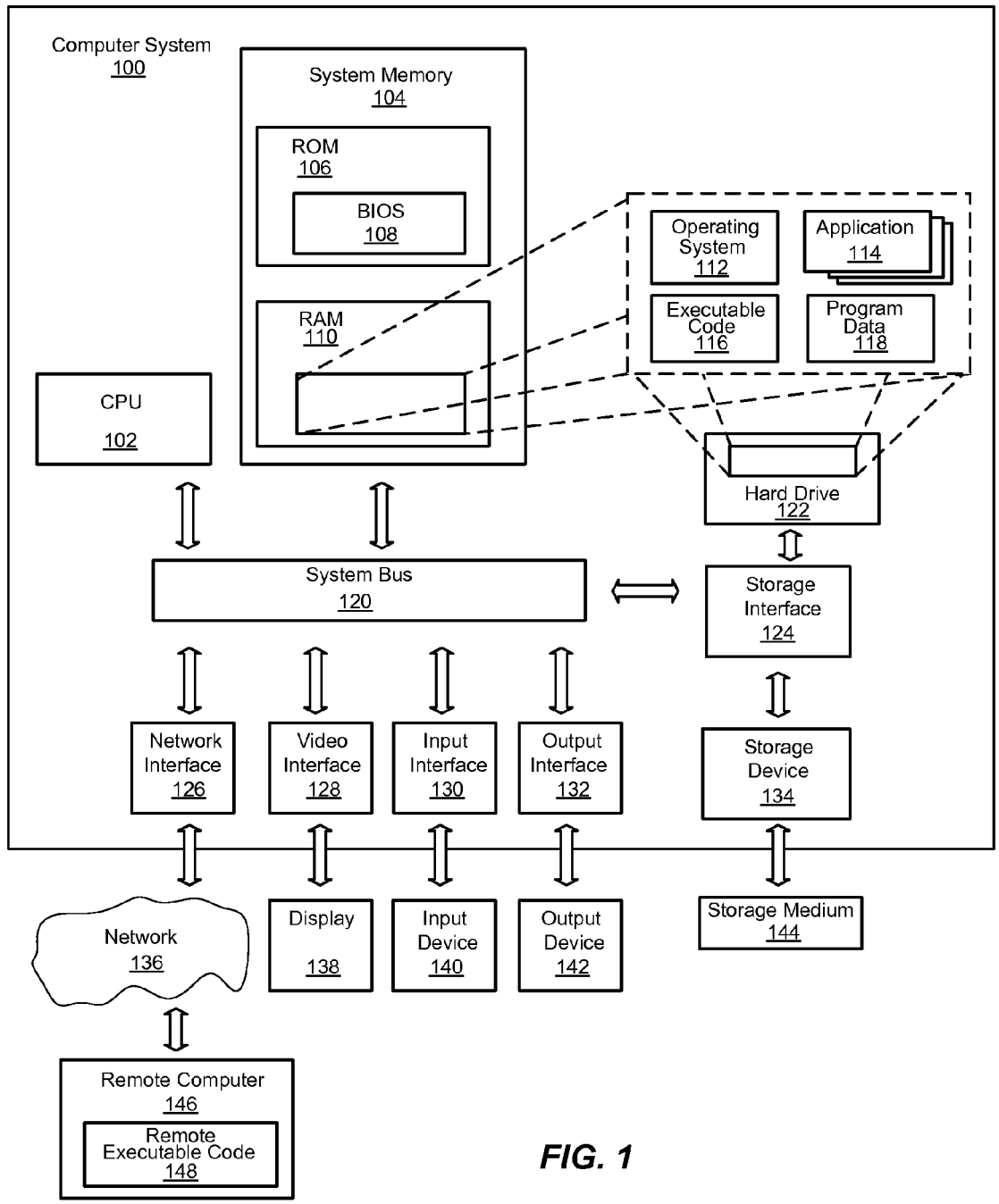
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, non-volatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used. Those skilled in the art will also appreciate that many of the components of the computer system 100 may be implemented within a system-on-a-chip architecture including memory, external interfaces and operating system. System-on-a-chip implementations are common for special purpose hand-held devices, such as mobile phones, digital music players, personal digital assistants and the like.

Ranking Search Results Using Social Information

The present invention is generally directed towards a system and method for ranking search results using social information. A search query may be received by a search engine, and a list of references for web pages may be obtained for search results. The web search results may be refined by applying the search query to a searchable social domain such as website with user provided content such as Flickr, Facebook, Digg, Delicious, and using the search results from the searchable social domain to rerank the web search results. In various embodiments, the social information domain may be requested by a user. As used herein, a social information domain may mean a social network website or a website with searchable content annotated by users, including video, audio, or multimedia content. The social information domain received may be used to rerank the list of reference of web pages for search results, and the reranked list of references to web pages may then be sent as search results to a client device for display to a user.

As will be seen, the present invention may support many applications for ranking search results using social information. For example, online search applications may use the present invention to rank a list of search results using social information from a social network website. Or online search applications may use the present invention to rank a list of search results using social information from a website that supports content for a particular social interest. As will be understood, the various block diagrams, flow charts and scenarios described herein are only examples, and there are many other scenarios to which the present invention will apply.

Figure 2:
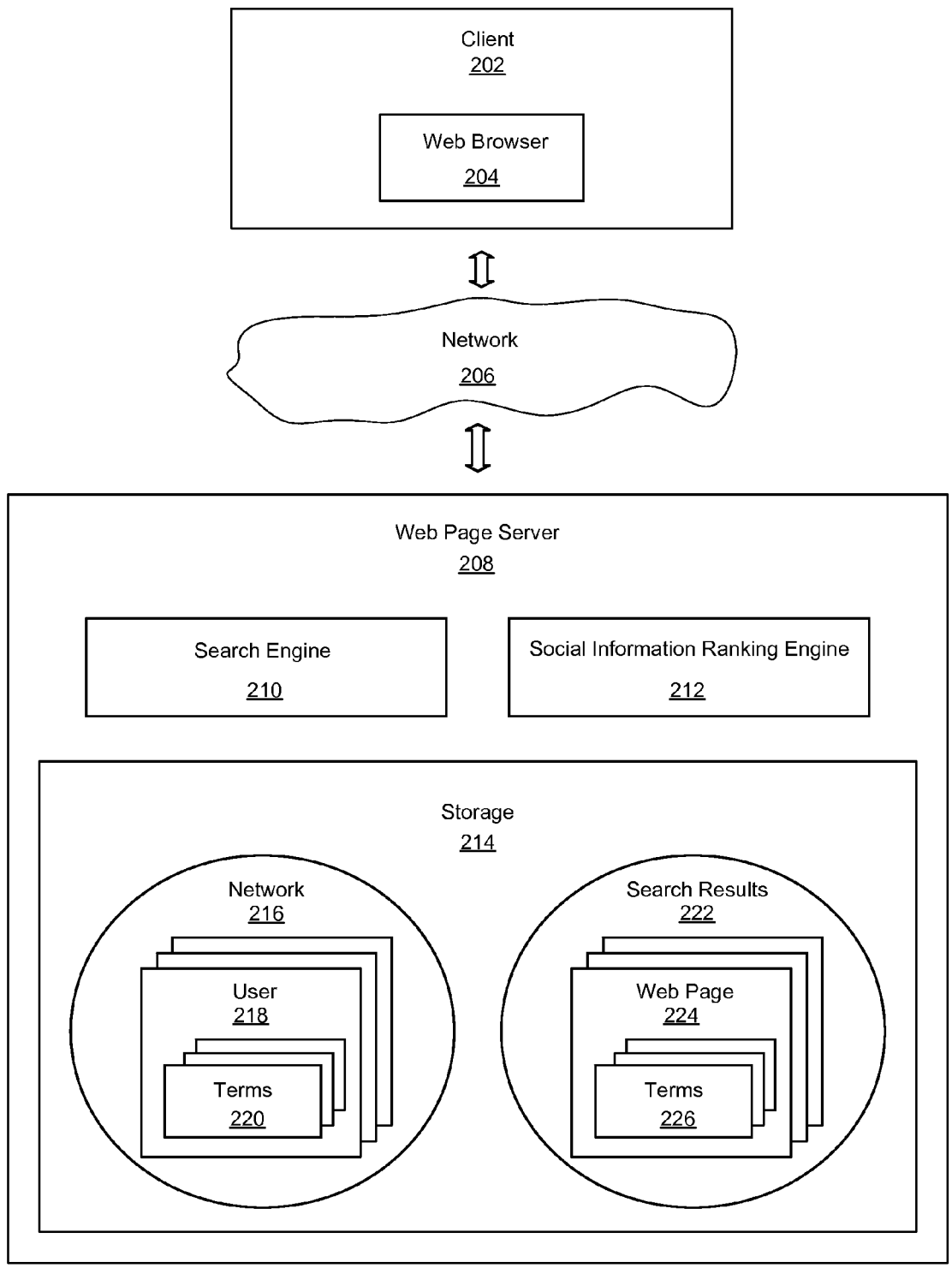
FIG. 2 is a block diagram generally representing an exemplary architecture of system components for ranking search results using social information, in accordance with an aspect of the present invention.

Turning to FIG. 2 of the drawings, there is shown a block diagram generally representing an exemplary architecture of system components for ranking search results using social information. Those skilled in the art will appreciate that the functionality implemented within the blocks illustrated in the diagram may be implemented as separate components or the functionality of several or all of the blocks may be implemented within a single component. For example, the functionality for the social information ranking engine 212 may be included in the same component as the search engine 210. Or the functionality of the social information ranking engine 212 may be implemented as a separate component from the search engine 210 as shown. Moreover, those skilled in the art will appreciate that the functionality implemented within the blocks illustrated in the diagram may be executed on a single computer or distributed across a plurality of computers for execution.

In various embodiments, a client computer 202 may be operably coupled to one or more servers 208 by a network 206. The client computer 202 may be a computer such as computer system 100 of FIG. 1. The network 206 may be any type of network such as a local area network (LAN), a wide area network (WAN), or other type of network. A web browser 204 may execute on the client computer 202 and may include functionality for receiving a search request which may be input by a user entering a query and functionality for sending the query request to a server to obtain a list of search results. The web browser 204 may additionally include functionality for receiving a request for ranking the search results using a specific social information domain, such as a social network website or a website that supports content for a particular social interest. In general, the web browser 204 may be any type of interpreted or executable software code such as a kernel component, an application program, a script, a linked library, an object with methods, and so forth.

The web page server 208 may be any type of computer system or computing device such as computer system 100 of FIG. 1. In general, the web page server 208 may provide services for processing a search query and may provide services for returning search results from processing a search query. In particular, the web page server 208 may include a search engine 210 for finding search results for a search query and a social information ranking engine 212 for ranking search results using social information. The social information ranking engine 212 may apply social information such as a user's contacts, buddy list, and/or from other social information domains such as a social network to rank search results. Each of these modules may also be any type of executable software code such as a kernel component, an application program, a linked library, an object with methods, or other type of executable software code.

The web page server 208 may be operably coupled to a database of information such as storage 214 that may include a network 216 of multiple users 218 with each user associated with a list of terms 220. In an embodiment, the network 216 may be represented by a bipartite graph of users connected by weighted edges to terms. Storage 214 that may also include search results 222 with references such as a Uniform Resource Locator (URL) to web pages 224 with each web page associated with a list of terms 226. In an embodiment, the search results 222 may be represented by a dimensional vector of URLs with weighted terms.

Those skilled in the art will also appreciate that many of the components of the computer system 100 and the system components for ranking search results using social information illustrated in FIG. 2 may be implemented in various embodiments within a system-on-a-chip architecture including memory, external interfaces, the operating system, the search engine and the social information ranking engine. System-on-a-chip implementations are common for special purpose hand-held devices, such as mobile phones, digital music players, personal digital assistants and the like.

There may be many applications which may use the present invention for ranking search results using social information. For example, online search applications may use the present invention to rank a list of search results using social information from a social network website. Or online search applications may use the present invention to rank a list of search results using social information from a website that supports content for a particular social interest. Similarly, online search applications may use the present invention to select a list of products for an ecommerce transaction using social information from a social network website. For any of these online search applications, search results may be ranked by the present invention using social information for display to a user.

Figure 3:
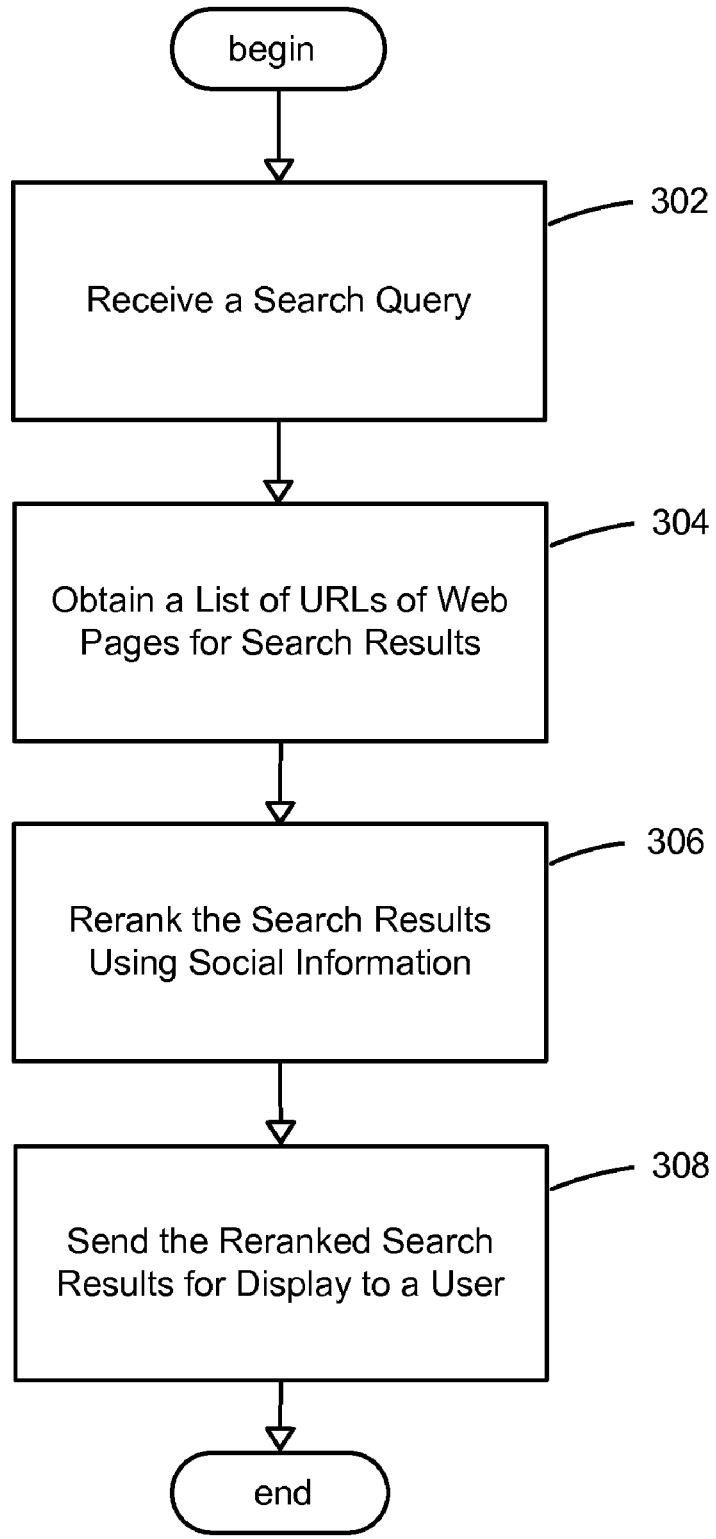
FIG. 3 is a flowchart generally representing the steps undertaken in one embodiment for ranking search results using social information, in accordance with an aspect of the present invention.

FIG. 3 presents a flowchart for generally representing the steps undertaken in one embodiment for ranking search results using social information. At step 302, a search query may be received for processing, for instance, by a search engine. At step 304, a list of URLs for web pages may be obtained for search results. In an embodiment, a search engine may obtain a ranked list of URLs that may be represented by a dimensional vector of URLs with weighted terms.

At step 306, the search results may be ranked using social information. In general, the search query may also be applied to a searchable social information domain such as a website with user provided content such as Flickr, Facebook, Digg, Delicious, and the search results from the searchable social domain may be used to rerank the web search results. In particular, a bipartite graph may be constructed that matches users to relevant terms that may appear, for instance, from tags pulled from the results page for that query applied on some social domain, and each edge may be weighted by the number of times the user referenced that term. And at step 308, the search results reranked using social information may be sent for display to a user.

Figure 4:
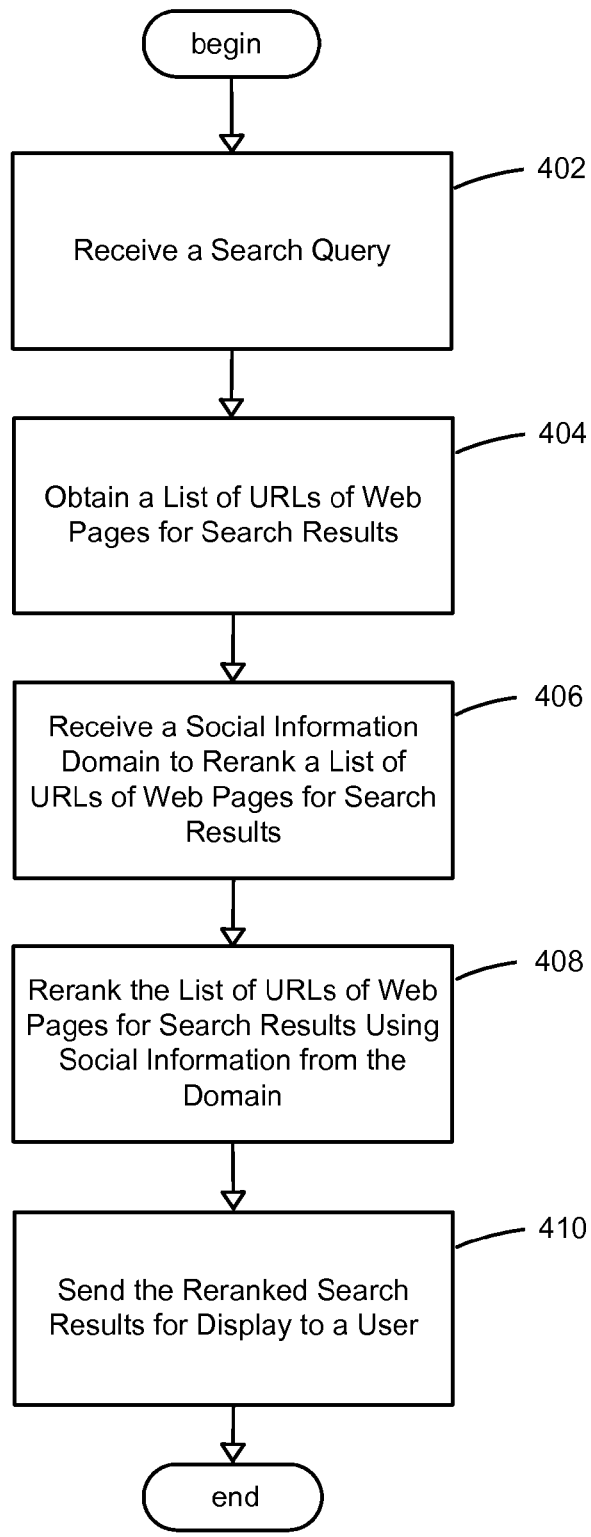
FIG. 4 is a flowchart generally representing the steps undertaken in one embodiment for ranking search results using social information from a selected social information domain, in accordance with an aspect of the present invention.

FIG. 4 presents a flowchart for generally representing the steps undertaken in one embodiment for ranking search results using social information from a selected social information domain. At step 402, a search query may be received for processing, for instance, by a search engine. At step 404, a list of URLs for web pages may be obtained for search results. In an embodiment, a search engine may obtain a ranked list of URLs that may be represented by a dimensional vector of URLs with weighted terms.

At step 406, a social information domain may be received to be used to reorder a list of URLs of web pages for search results. In an embodiment, the social information domain may represent a social network website or a website that supports content for a particular social interest. In various embodiments, the social information domain may be requested by a user. At step 408, a list of URLs of web pages for search results may be reranked using social information from the social information domain. And at step 410, the search results reranked using social information from the social information domain may be sent for display to a user.

Figure 5:
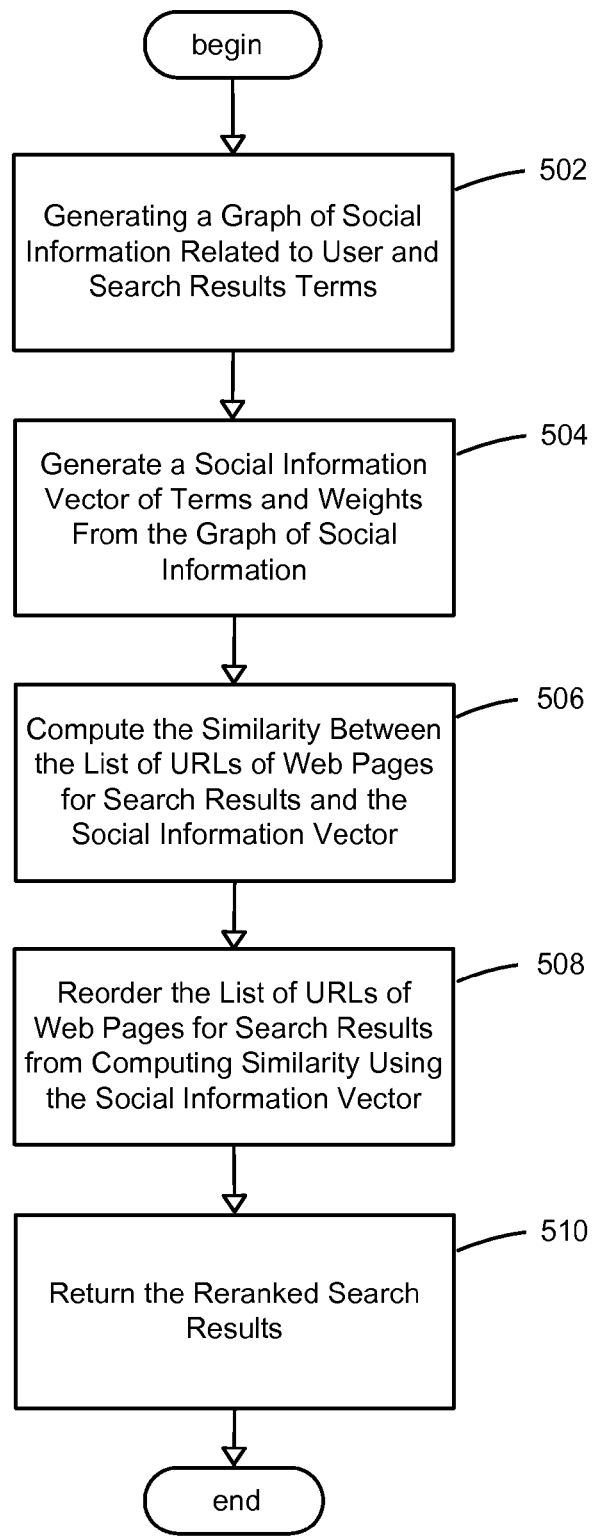
FIG. 5 is a flowchart generally representing the steps undertaken in one embodiment for reranking search results using social information, in accordance with an aspect of the present invention.

FIG. 5 presents a flowchart for generally representing the steps undertaken in one embodiment for reranking search results using social information. At step 502, a graph of social information related to user and search term results may be generated. For example, the user who authored the search query may be added to a graph. In an embodiment, an edge may be attached from the user to other users and a weight may be assigned from each edge to other users based on relationship.

For example the social relevance, SR, of a term, t, may be represented by the probability of $Pr(SR|t)=Pr(t|SR)*Pr(SR)$. The social relevance of a term may be calculated for each user u which mentioned term t. The probability of each user's affinity to the term multiplied by the searcher's affinity to the user may be represented by $prod[Pr(t|SR, u)*Pr(SR, u)]$, where $Pr(t|SR, u)$ is the term frequency of t for u and $Pr(SR, u)$ is the trust level between u and the searcher, i.e. sim(u, searcher). A social information document vector may be built using this probability on top of an ordinary term frequency*inverse document frequency+normalization as is well-known in the art.

At step 504, a social information vector of terms and weights may be generated from the graph of social information. In an embodiment the social information vector may be represented by a dimensional vector of users with weighted terms. And at step 506, the similarity between the list of URLs of web pages for search results and the social information vector may be computed. For instance, the dot product may be computed in an embodiment between a dimensional vector representing the list of URLs of web pages for search results with the weighed terms and a dimensional vector representing the plurality of users with the weighted terms. At step 508, the list of URLs of web pages for search results may be reranked by similarity score computed using the social information vector. And at step 510, the reranked search results may be returned.

By applying query insights from social searchable properties, the present invention may refine search results to provide more relevant search results. Advantageously, the system and method may efficiently filter search results of a search query and more effectively find the content desired by leveraging a user's affinity to a trusted community. In addition, the user experience may improve in many online search applications. Importantly, the system and method may apply to different types of rich media content, including video, audio, and text authored by users.

As can be seen from the foregoing detailed description, the present invention provides an improved system and method for ranking search results using social information. A social information ranking engine may be provided to rerank a list of URLs of web pages in search results from a search engine using social information. To do so, the search query may be applied to a social information domain and a second list of references to web pages may be obtained as search results. A dimensional vector of users with the plurality of terms may be constructed using search results from social information domain, and a similarity measure may be computed between the references to web pages obtained from search results by the search engine and the references to web pages obtained from search results by the social information ranking engine. The score from the similarity measure may then be used to rerank the list of references to web pages. Many applications may use the present invention for ranking search results using social information, including online search applications to rank a list of search results using social information from a social network website. As a result, the system and method provide significant advantages and benefits needed in contemporary computing, and more particularly in online search applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for providing search results for a query, comprising:

a search engine that receives a search query and obtains a list of URLs of web pages as search results;

a social information ranking engine operably coupled to the search engine to rank the list of URLs of web pages using social information;

wherein the search engine receives from a client device a social information domain to be used to rerank the search results using the social information;

wherein the search engine reranks the search results using the social information;

wherein reranking the search results using social information further comprises generating a bipartite graph with a plurality of users connected by weighted edges to a plurality of terms, wherein the edges are weighted by a number of times the user referenced the term, and generating a dimensional vector of a plurality of users with a plurality of terms from the bipartite graph with the plurality of users connected by weighted edges to the plurality of terms, wherein the edges are weighted by a number of times the user referenced the term; and a web page storage operably coupled to the social information ranking engine that stores a network of users associated with a plurality of terms.

2. The system of claim 1 further comprising a web browser operably coupled to the search engine to display the list of URLs of web pages ranked using social information.

3. A computer-implemented method for providing search results for a query, comprising:

receiving a search query to obtain a plurality of references to web pages as search results;

obtaining the plurality of references to web pages as search results;

receiving from a client device a social information domain to be used to rerank the plurality of references to web pages as search results using social information from the social information domain;

reranking the plurality of references to web pages using social information;

wherein reranking the plurality of references to web pages using social information further comprises generating a bipartite graph with a plurality of users connected by weighted edges to a plurality of terms, wherein the edges are weighted by a number of times the user referenced the term, and generating a dimensional vector of a plurality of users with a plurality of terms from the bipartite graph with the plurality of users connected by weighted edges to the plurality of terms, wherein the edges are weighted by a number of times the user referenced the term; and sending the reranked plurality of references to web pages as search results to a client device for display to a user.

4. The method of claim 3 wherein the social information domain comprises a social network website.

5. The method of claim 3 wherein reranking the plurality of references to web pages using social information further comprises computing a similarity between the plurality of references to web pages with a plurality of terms and a plurality of users with a plurality of terms.

6. The method of claim 5 wherein computing a similarity between the plurality of references to web pages with a plurality of terms and a plurality of users with a plurality of terms comprises computing a dot product of a dimensional vector representing the plurality of references to web pages with the plurality of terms and a dimensional vector representing the plurality of users with the plurality of terms.

7. The method of claim 3 wherein reranking the plurality of references to web pages using social information further comprises obtaining a second plurality of references to a second plurality of web pages as search results from a social network website.

8. The method of claim 7 further comprising constructing a dimensional vector of a plurality of users with a plurality of terms from the second plurality of references to the second plurality of web pages as search results from the social network website.

9. The method of claim 8 further comprising computing a dot product of a dimensional vector representing a plurality of references to web pages with a plurality of terms and the dimensional vector representing the plurality of users with the plurality of terms from the second plurality of reference to the second plurality of web pages.

10. A non-transitory computer-readable storage medium having computer-executable instructions for performing the method of claim 3.

11. A non-transitory computer-readable storage medium having computer-executable instructions for performing the steps of:

receiving a search query to obtain a plurality of references to web pages as search results; obtaining the plurality of references to web pages as search results;

obtaining from a client device a second plurality of references to a second plurality of web pages as search results from a social information domain;

reranking the plurality of references to web pages using the second plurality of references to the second plurality of web pages as search results from the social information domain;

wherein reranking the plurality of references to web pages using the second plurality of references to the second plurality of web pages as search results from the social information domain further comprises generating a bipartite graph with a plurality of users connected by weighted edges to a plurality of terms, wherein the edges are weighted by a number of times the user referenced the term, and generating a dimensional vector of a plurality of users with a plurality of terms from the bipartite graph with the plurality of users connected by weighted edges to the plurality of terms, wherein the edges are weighted by a number of times the user referenced the term; and sending the reranked plurality of references to web pages as search results to a client device for display to a user.

12. The non-transitory computer-readable storage medium of claim 11 further comprising computer-executable instructions for performing the step of computing a dot product of a dimensional vector representing a plurality of references to web pages with a plurality of terms and the dimensional vector representing the plurality of users with the plurality of terms.

13. The non-transitory computer-readable storage medium of claim 11 further comprising computer-executable instructions for performing the step of receiving a reference to the social information domain for obtaining the second plurality of references to the second plurality of web pages as search results.

14. The non-transitory computer-readable storage medium of claim 11 wherein the computer-executable instructions for performing the step of obtaining the second plurality of references to the second plurality of web pages as search results from the social information domain comprises computer-executable instructions for performing the step of obtaining the second plurality of references to the second plurality of web pages as search results from a social network website.

* * * * *